United States Patent [19]

Shumard

[11] Patent Number: 4,779,900

[45] Date of Patent: Oct. 25, 1988

[54] SEGMENTED PIPE JOINT RETAINER GLANDS

[75] Inventor: Dennis D. Shumard, Eastland, Tex.

[73] Assignee: Ebaa Iron Inc., Eastland, Tex.

[21] Appl. No.: 13,358

[22] Filed: Feb. 11, 1987

[51] Int. Cl.[4] ............................................... F16L 17/06
[52] U.S. Cl. ................................... 285/114; 285/337;
285/364; 285/368; 285/415
[58] Field of Search ............... 285/337, 364, 406, 412,
285/414, 415, 368, 114

[56] References Cited

U.S. PATENT DOCUMENTS

| | | | |
|---|---|---|---|
| 1,062,438 | 5/1913 | Clark | 285/337 |
| 1,098,299 | 5/1914 | Powell | 285/337 |
| 1,423,754 | 7/1922 | Clark | 285/337 |
| 2,821,416 | 1/1958 | Soehnlen et al. | 285/295 |
| 3,627,357 | 12/1971 | Sanders | 285/343 |
| 3,700,270 | 10/1972 | Howard | 285/337 |
| 3,726,549 | 4/1973 | Bradley Jr. | 285/356 |
| 3,910,610 | 10/1975 | Turner et al. | 285/337 |
| 4,092,036 | 5/1978 | Sato et al. | 285/337 |
| 4,660,266 | 4/1987 | Horn | 285/412 |

FOREIGN PATENT DOCUMENTS

| | | | |
|---|---|---|---|
| 515169 | 7/1954 | Belgium | 285/406 |
| 861335 | 2/1941 | France | 285/406 |
| 1219043 | 1/1971 | United Kingdom | 285/337 |

Primary Examiner—Randolph A. Reese
Assistant Examiner—Anthony Knight
Attorney, Agent, or Firm—Johnson & Swanson

[57] ABSTRACT

A segmented retainer gland assembly for holding pipe joints and the like together, including at least two gland segments in the shape of a circular arc forming together a circular gland for securing around a circular pipe, each of the segments having end flanges projecting substantially perpendicular to one side face of the gland segment, a clamping bracket having an inside face provided with a recess sized and shaped to receive the two end segment end flanges when adjacent ends of the gland segments are positioned together, each of the clamping brackets and gland segments having bolt holes and each of the clamping brackets having corresponding bolt holes which align with the bolt holes in the gland segments when the segments are positioned together, and bolts and nuts for securing the clamping brackets on the gland segments to hold the segments together at the end flanges to form a circular gland when the flanges are assembled together. Tapered, circular, and square configured gland segment end flanges and clamping bracket inside recesses are provided in different embodiments. A joint restraint harness is also disclosed including two gland assemblies, one on a pipe spigot end and the other on a bell of a joint, held together by axial tie rods.

6 Claims, 4 Drawing Sheets

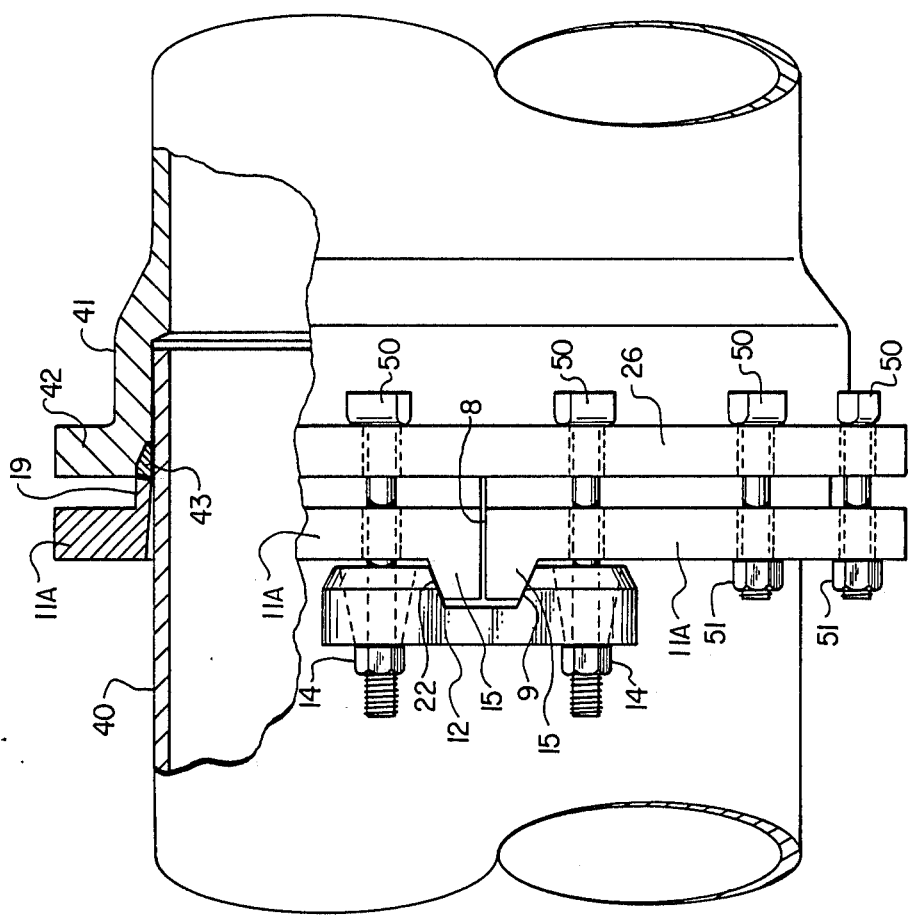
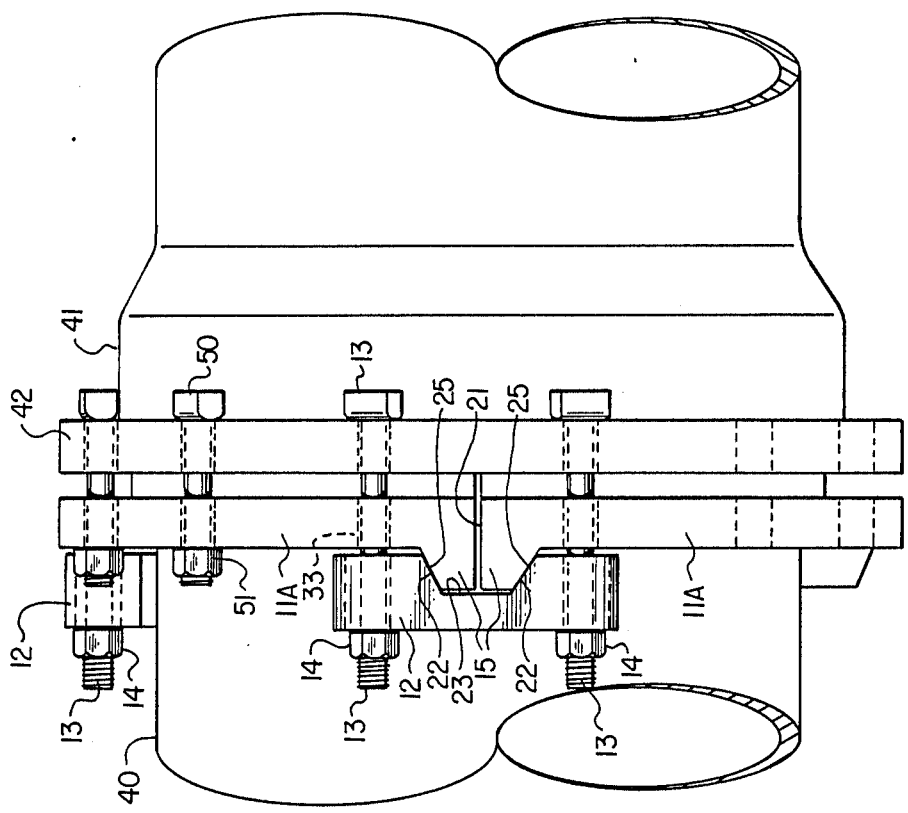

SEGMENTED PIPE JOINT RETAINER GLANDS

BACKGROUND OF THE INVENTION

1. Field of the Invention

This invention relates to pipe joint apparatus and more particularly relates to retainer glands for holding pipe joints together.

2. History of the Prior Art

The use of segmented or split pipe joint retainer glands is well known. In addition to being used on pipe joints, such devices also have been used on valves, fittings, hydrants, and other pipe connections where it is necessary to secure together or restrain two members which tend to separate in response to fluid pressure from within. Typical uses for such pipes structure are sewers and for water distribution. Some prior art devices are shown in U.S. Pat. Nos. 3,627,357 and 3,726,549. Another apparatus for connecting pipes together is illustrated in U.S. Pat. No. 2,821,416. Both U.S. Pat. Nos. 3,726,549 and 2,821,416, show segmented pipe retainer glands which are secured together around a pipe section by ears or lugs formed on and extending radially outwardly from adjacent ends of the gland segments. Such segmented glands have been used on small pipe diameters. In the past, the strength requirements for large diameter pipe lines has limited the segmented gland use to very low pressures. Most such prior art designs utilize a simple bolt connection between the lugs on the ends of the gland segments. Such arrangements allows the segments to bend and separate at the joints between the segments, thereby reducing the grip on the pipe surface to the extent that the retainer glands slip and the joints separate. The stress in the conventional prior art devices between the clamping ears and the circular segments of a segmented gland are along planes which are generally axial and circumferential. The prior art devices having segments held together by bolted end lugs are limited in size. It has been found that those as large as 12 inches in diameter will not function satisfactorily. In contrast, segmented glands made in accordance with the present invention can range in size from 4 inches to 48 inches in diameter.

SUMMARY OF THE INVENTION

It is a principal object of the invention to provide new and improved segmented retainer glands.

It is another object of the invention to provide new and improved segmented retainer glands which are particularly useful on pipe joints, valves, fittings, hydrants, and the like.

It is another object of the invention to provide segmented retainer glands which may be made in a wide variety of sizes including particularly large sizes which will function under high pressures.

It is another object of the invention to provide segmented retainer glands wherein the clamping force between the gland segments increases as the pressure within the members secured together by the glands increases.

It is another object of the invention to provide a restraint harness for a pipe joint comprising a spigot end of a first pipe in a bell on the end of a second pipe.

In accordance with the invention there is provided a segmented retainer gland for pipe joints and the like, including at least two circular segments sized to fit together to form a circular gland around a pipe, each of the segments having an integral end clamping flange at each end of each segment extending perpendicular to the segment face and in a plane extending essentially axially and radially relative to a longitudinal axis about which the gland segment is generated, a clamping bracket having a recess in one face sized and shaped to fit over each pair adjacent clamping lugs and having opposed clamping surfaces engageable with outside clamping surfaces on the adjacent lugs, and axially aligned bolts for engagement through axial holes in the gland segments spaced from the end flanges for holding the clamping brackets over the end flanges.

The retainer gland assembly may include structure for engaging the pipe surface surrounded by the gland assembly. Two of the gland assemblies may be used to form a harness securing a spigot end of a pipe in a bell end of a pipe.

BRIEF DESCRIPTION OF THE DRAWINGS

The details of specific embodiments of the invention and the foregoing objects and advantages will be better understood from the following description taken in conjunction with the accompanying drawings wherein:

FIG. 3 is a side view of the three segment retainer gland shown in FIG. 2 mounted on a joint between a spigot end of a pipe telescoped into a bell end on an axially aligned pipe;

FIG. 4 is a view similar to FIG. 3 partially broken away in section to show a seal between the gland segments and a flange on the bell end;

DETAILED DESCRIPTION OF THE PREFERRED EMBODIMENT

Figure 1:
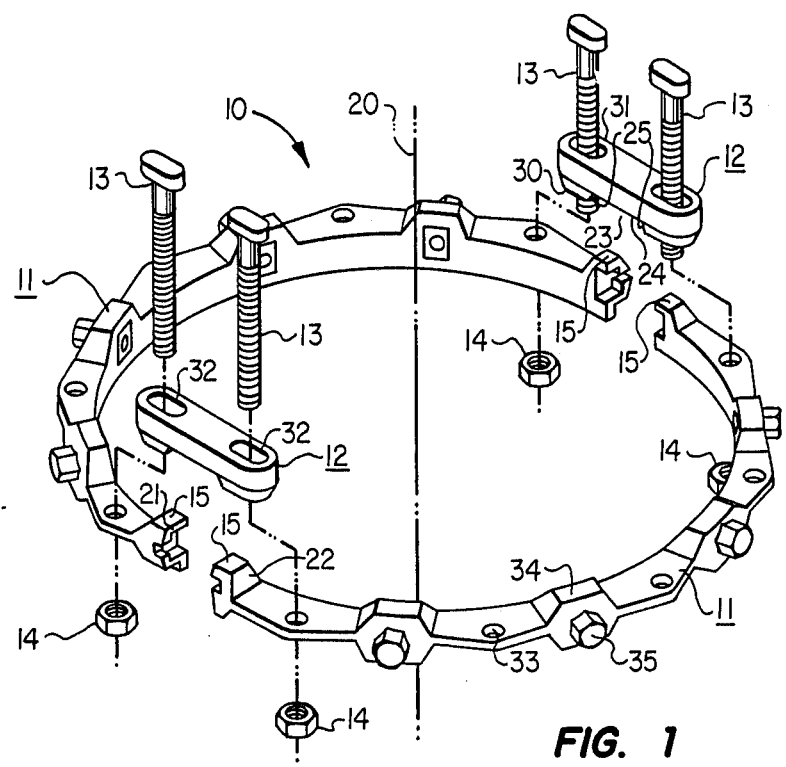
FIG. 1 is an exploded prospective view of a two segment retainer gland embodying the features of the invention, showing the clamping brackets and T-bolts rotated 90 degrees to better illustrate such components.

Referring to FIG. 1, a segmented pipe joint retainer gland 10 embodying the features of the invention includes identical semicircular gland segments 11, two identical clamping brackets 12, and bolts and nuts 13 and 14 respectively. Each of the glands segments 11 is a semicircular member provided with opposite end clamping flanges 15. For purposes of reference only, FIG. 1 shows an axis 20 which is defined as the longitudinal axis through the gland assembly 10 which shall be considered as the center of an imaginary circle defined by the two half circular gland segments 11. The extends through the center of such circle and perpendicular to the plane in which the circle through the segments lies. Thus, the end clamping flanges 15 are positioned in planes which are parallel with the axis 20 and aligned with a radius line, not shown, extending from the axis 20 through the end flanges 15. Stated otherwise, for geometric orientation, the end flanges 15 may be considered as positioned in planes which extend perpendicular to a circle within the gland segments 11. Each of the end flanges 15 has a flat inside end face 21 which lies in a plane including the axis 20 and a radius line from the axis 20 extending to the end flange so that when the two gland segments 11 are assembled together to form a circular gland the inside end faces 21 of adjacent end flanges are in full contact with each other. Each of the end flanges 15 has an outside wedge face 22 lying in a plane parallel with a radius line drawn to the inside face 21 and sloping outwardly from the gland body toward the inside face 21. Thus, when the two gland halves are assembled together the wedge surfaces 22 on adjacent end flanges 15 slope outwardly from the assembled gland toward each other to provide a wedging effect urging the gland halves together when they are held in assembled relationship by the clamping brackets 12. Each of the clamping brackets 12 has an inside recess 23 defined by a bottom surface 24 and sloping opposite side surfaces 25. The surfaces 25 slope together toward the bottom surface 23 and are positioned at angles which conform with the wedging surfaces 22 on the gland segment end flanges 15 so that when the gland segments are assembled together with adjacent end flanges in engagement and the clamping brackets 12 are positioned over the end flanges, the clamping bracket surfaces 25 engage the end flange surfaces 22, as seen in FIG. 3. The depth of the recess 24 is less than the height of the end flanges 15 to permit a wedging effect between the clamping brackets and the end flanges, as discussed in more detail hereinafter. The bottom surface 24 of the recess 23 and the opposite inside and outside faces 30 and 31, respectively, of the clamping brackets all lie in parallel planes. Each of the clamping brackets 12 has spaced parallel bolt holes 32 in opposite end portions of the brackets extending through the brackets perpendicular through the opposite faces 30 and 31 of the brackets to receive the bolts 13 to secure the brackets to the gland segments. The gland segments are provided with circumferentially spaced bolt holes 33 used to secure the gland in a pipe joint and to secure the clamping brackets to the gland segments. The end holes 33 in each of the gland segments, as evident in FIG. 1, are used for securing the clamping brackets to the gland segments. The holes 33 in the gland segments extend along axes which are parallel to the axis 20, and thus, when the gland segments are assembled on a pipe extend along lines parallel with the axis of the pipe.

Figure 6:
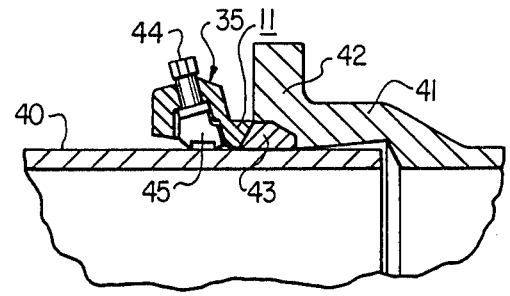
FIG. 6 is a fragmentary view in section similar to FIG. 5 showing another form of pipe restraint incorporated in the gland segments.

Each of the gland segments 11 illustrated in FIG. 1 is provided with circumferentially spaced enlarged integral portions or protrusions 34 projecting from one face of the segments. A lug assembly 35 is mounted and each of the protrusions 34 for releasably securing the gland to the surface of a pipe as illustrated in FIG. 6. The lug assembly 35 is disclosed and claimed in U.S. Pat. No. 4,092,036 issued May 30, 1978, and sold by Ebaa Iron, Inc. Eastland, Tex. under the registered trademark MEGALUG. The lug assembly 35 is only one of several forms of structure which may be used to connect the assembled gland segments on a pipe, as discussed hereinafter. FIG. 6 illustrates the use of the lug assemblies 35 when the gland segments 11 are assembled at a pipe joint with the segments clamped together around the pipe in the relationship represented in FIGS. 2 and 3. A three segment gland is represented in FIGS. 2 and 3, with the connection between the segments by the clamping brackets 12 being identical with the two segment gland of FIG. 1.

Referring to FIG. 6, the joint illustrated is formed between a spigot end 40 of a pipe telescoped into a bell pipe end 41 having an annular flange 42. The flange 42 is provided with an internal annular recess in which an annular gasket 43 is positioned to seal between the two pipes. With the pipe segments 11 around the pipe end 40 at the flange 42, the ends of the gland segments are connected together by the clamping brackets 12 in the manner illustrated in FIGS. 2 and 3. The bolts 13 and nuts 14 are used to hold the clamping brackets over the end flanges 15 on the gland segments. Similar bolts, not shown, extending axially through the holes 33 in the gland segments secure the assembled gland segments to the bell pipe flange 42 as represented in FIGS. 2 and 3. The assembled gland segments forming the gland assembly 10 are pulled tightly toward the flange 42 so that the seal 43 will effectively seal between pipe end 40 in the bell 41. The lug assemblies 35 secure the gland assembly to the pipe 40 by means of the lug bolts 44 which are tightened against the pipe engaging lugs 45 of the assemblies 35. As previously stated, further specific details of the lug assemblies 35 are described and illustrated in U.S. Pat. No. 4,092,036.

Figure 2:
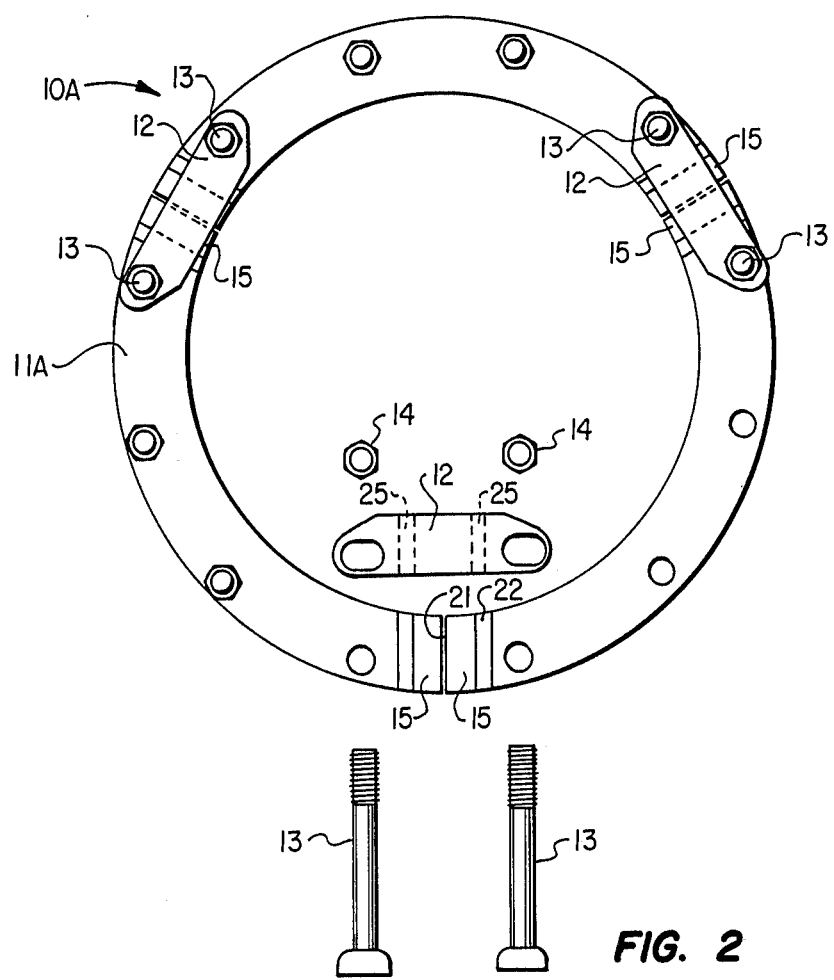
FIG. 2 is a plan view of a three segment retainer gland similar to FIG. 1, showing the segments positioned together in a circular array with two of the joints between the segments secured by the clamping brackets and bolts and the clamping brackets and bolts at the third joint removed from the joint and the bolts rotated 90 degrees.

FIGS. 2, 3, and 4 illustrate an embodiment of a split retainer gland assembly 10A which includes three retainer gland segments 11A. The retainer gland assembly 10A as illustrated, is primarily for joint sealing. Each of the gland segments 11A has end flanges 15 which are identical to the flanges 15 on the semicircular segments 11 shown in FIG. 1. The end flanges 15 on the gland segments 11A are provided with identical inner and outer faces 21 and 22 as previously described. The gland segments 11A are held together by the clamping brackets 12 used in the gland assembly 10 of FIG. 1. It will be noted that FIG. 2 two of the clamping brackets in place, and the third disassembled. FIGS. 3 and 4 show a side elevation of the clamping brackets in place held by the bolts 13 and nuts 14. The lower left clamping bracket 12 of FIG. 2 is shown disassembled only for purposes of illustration of the component parts. As seen in FIGS. 3 and 4, the gland assembly 10A is secured to the bell housing flange 42 by T-bolts 50 and nuts 51. The bolts 50 pass through bolt holes in both the gland segments 11A and in the flange 42, as seen in both FIGS. 3 and 4. As illustrated in FIG. 4, an annular seal 43 is held in the flange recess by the retainer gland segments. It will be apparent from FIGS. 3 and 4 that the coaction between each bracket 12 and the retainer gland end flanges 15 urges the flanges together holding the three glands segments 11 in a circular gland assembly. The coaction between the wedge surfaces 22 on the end flanges of the gland segments and the wedge surfaces 25 of the brackets 12 urge the gland segments together at the contacting ends responsive to the longitudinal force applied by the nuts 14, depending upon how tightly the nuts are drawn on the bolts 13.

Figure 5:
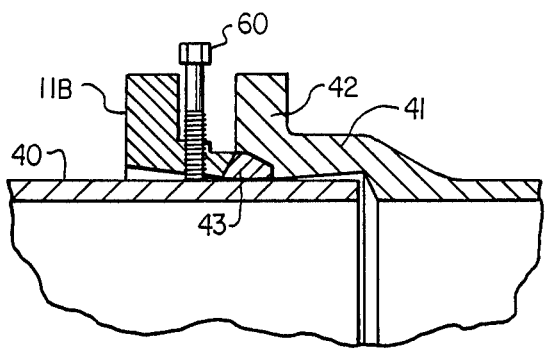
FIG. 5 is a fragmentary view in section showing a joint similar to FIG. 4 illustrating one form of pipe restraint incorporated in the gland segments.

FIG. 5 illustrates a joint assembly similar to that shown in FIG. 4 modified, however, to include gland segments 11B which have a plurality of radial bolts 60 threaded through circumferentially spaced holes in the gland segments between the opposite ends thereof to engage the outer surface of the pipe end 40. Other than utilizing the bolts 60, the gland segments 11B are identical to the previously gland segments 11A of FIGS. 2–5. The inward ends of the bolts 60 engage the outer surface of the pipe 40 to grip the pipe similarly as the lugs 45 shown in FIG. 6 grip the pipe surface. With the pipe ends 40 secured to the bell housings 41, as illustrated in both FIGS. 5 and 6, an increase in pressure within the pipe joint tends to apply a longitudinal force in the joint urging the pipe sections apart. This longitudinal force tends to pull the gland segments away from the bell housing flange thereby applying longitudinal forces in the bolts 13 holding the brackets 12 over the gland segment end flanges. Thus, there is an effective force urging the gland segment end flanges toward the clamping brackets 12 so that the flanges are squeezed together thereby tightening the grip of the segmented gland assembly on the pipe end which is proportional to the separating force in the pipe joint. The wedging effect between the surfaces 22 on the gland segment end flanges and the contacting inside surfaces 25 of the clamps 12 cause this wedging action tightening the gland segments.

Figure 7:
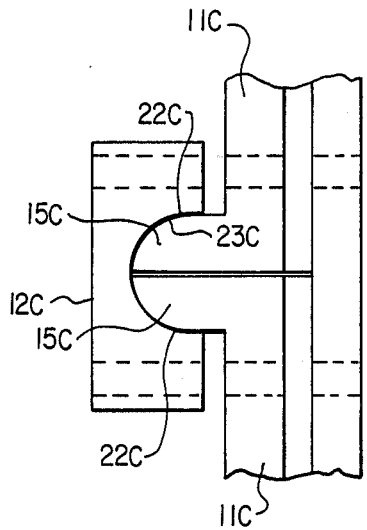
FIG. 7 is a fragmentary schematic side view in elevation showing an alternate design of the end flanges on the segments and the clamping bracket fitting over the flanges.
Figure 8:
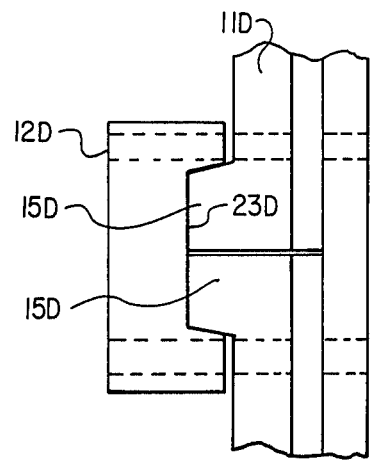
FIG. 8 is a fragmentary schematic side view in elevation showing another form of the end flanges on the gland segments and the clamping bracket for holding the flanges together.

FIG. 7 shows another embodiment of the end flange and clamping bracket features of the retainer gland segments. Referring to FIG. 7, gland segments 11C have end flanges 15C provides with semicircular outer wedge surfaces 22C. The clamping bracket 12C, similarly, has a semicircular inside face recess 23C which is sized and shaped to fit the semicircular surfaces 22C on the end flanges 15C. The clamping bracket 12C is secured with the retainer gland segments by bolts, not shown, in the same manner as the previously illustrated embodiments Illustrated in FIG. 8 is a further embodiment of the end flange and clamping bracket features of the retainer gland segments. Referring to FIG. 8, gland segments 11D have the features of the other glands segments except that the end flanges 15D are rectangular in cross section. The clamping bracket 12D has a rectangular inner face recess 23D sized and shaped to fit the end flanges 15D. The bracket 12D is secured with the retainer segments 11D in the same manner as previously described. The bracket 12D, however, holds the segments but is not responsive to longitudinal movement to increase the holding effect of the gland assembly in the pipe.

Figure 9:
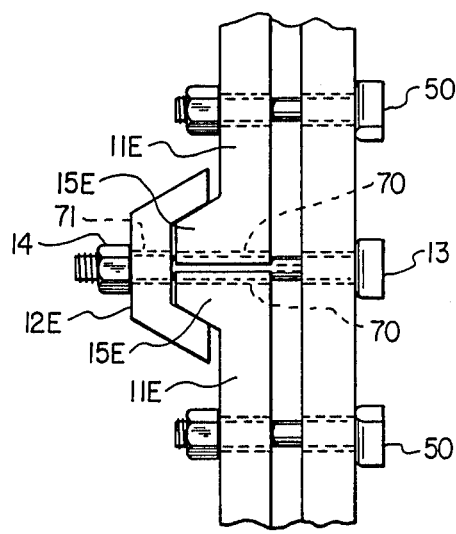
FIG. 9 is a fragmentary side view in elevation of a still further form of clamping bracket utilizing a single axial bolt for holding the end flanges together on the gland segments.

FIG. 9 illustrates an arrangement of the gland segment end flanges and clamping bracket utilizing a single bolt to hold the bracket on the end flanges at the connection between the adjacent gland segments. Referring to FIG. 9, gland segments 11E have end flanges 15E which has the external shape of the flanges 15 and are each provided with a semicylindrical bolt hole recess 70 which when fitted together accommodate one of the bolts 13. A clamping bracket 12E has a single bolt hole 71 for the shank of the bolt 13. The clamping bracket 12E has an internal recess 23 which receives the two retainer segment end flanges 15E. Tightening the nut 14 on the bolt 13 urges the end flange 15E into tight engaging relationship. The assembly shown in FIG. 9 functions identically to the other end flange and clamping bracket assemblies, and differs only in that a single bolt 13 is used to hold the clamping bracket in place on the end flanges.

Figure 10:
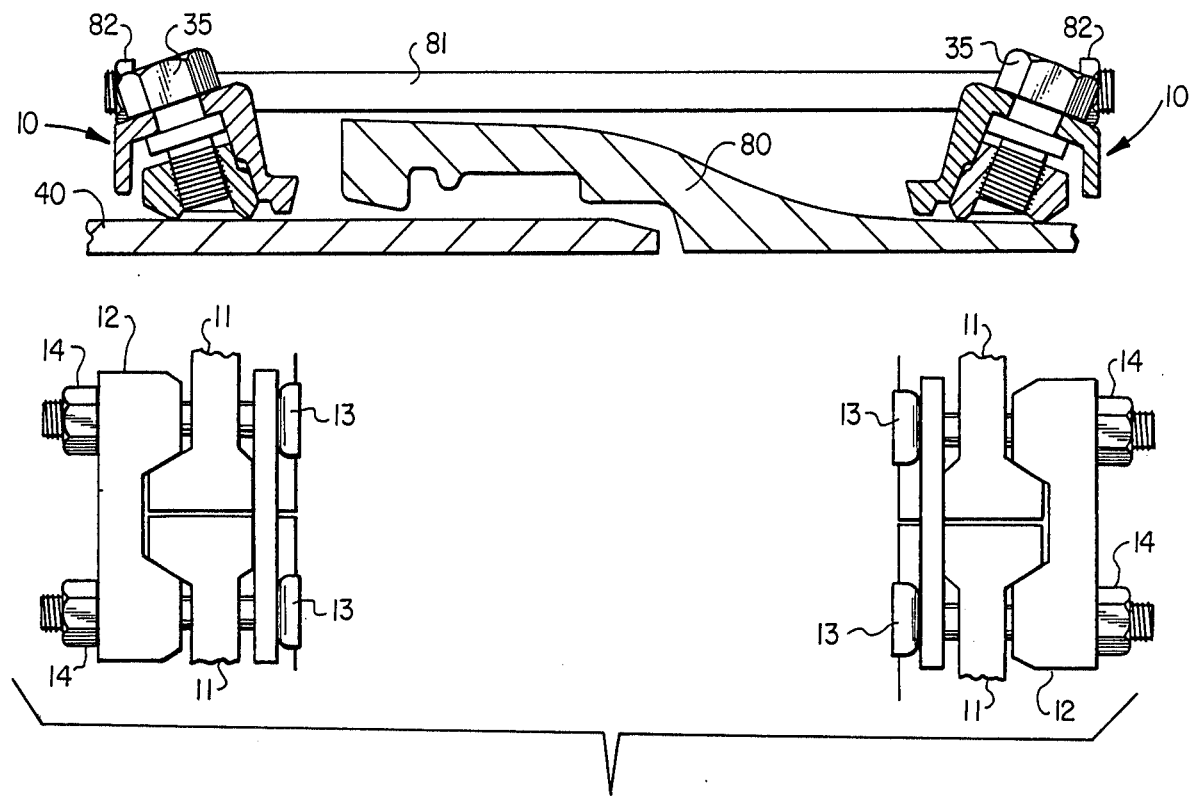
FIG. 10 is a broken view in elevation and section showing the structure of the invention applied as a bell restraint harness.

Referring to FIG. 10, two of the gland assemblies 10 as illustrated in FIG. 1, are used as a restraint harness between a pipe bell 80 and a spigot end of a pipe 40 telescoped into the bell. A gland assembly 10 is assembled on the pipe 40 and another gland assembly 10 is assembled on the pipe bell 80 substantially along the length of the bell at the location where the enlarged end portion of the bell begins. The gland assemblies 10 are each secured on the pipe and the bell respectively, in the same manner as previously described. A plurality of tie rods 81 are inserted through the holes 33 of the two gland assemblies 10 to couple the two assemblies together. The rods 81 may be threaded over the entire length of each rod, or along opposite end portions. Nuts 82 are tightened on each end of each of the rods against the outer face of each of the gland assemblies. Smaller diameter pipes, such as 14 through 20 inch, use four tie rods 81, while a larger 24 inch diameter pipe will utilize 6 tie rods. With the lug assemblies 35 tightened against the outer surface of the pipe 40 and the bell 80, the rods 81 with the nuts 82 hold the two gland assemblies 10 together forming a pipe joint restraint harness as illustrated. It will be apparent that the restraint harness may be installed on a pipe joint which is already in place because the gland assemblies 10 are formed by two or three sections which are assembled around the pipe end and the bell and then secured together by the clamping brackets 12.

Figure 11:
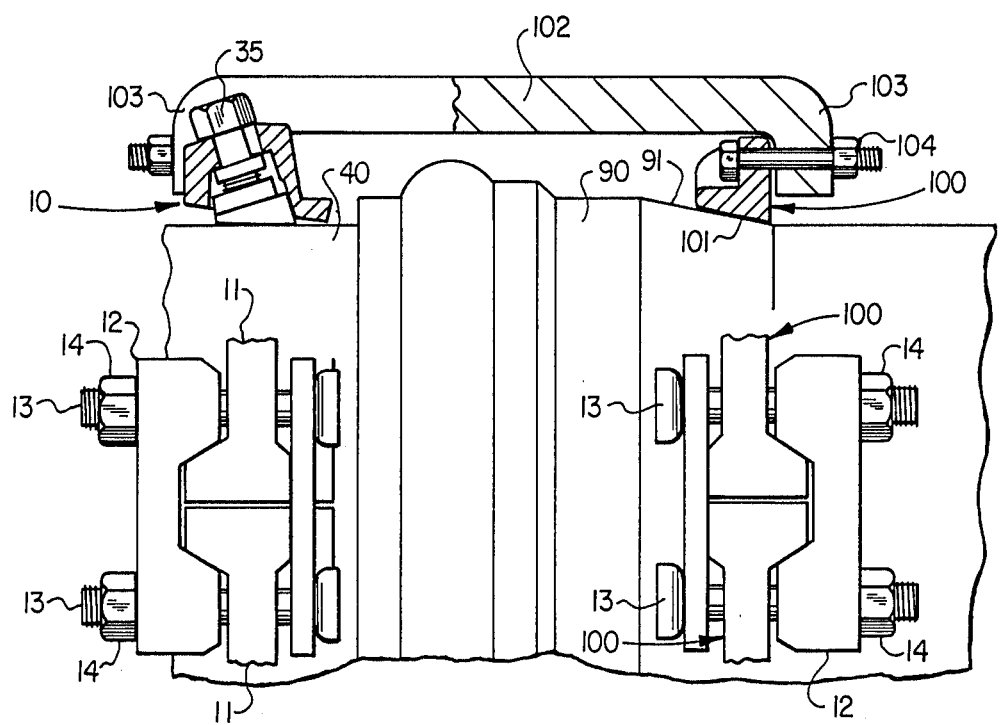
FIG. 11 is a broken view in section and elevation showing another application of the structure of the invention to a bell restraint harness.

Referring to FIG. 11, another bell restraint harness is illustrated holding together a joint between a spigot end of a pipe 40 and a pipe bell 90. A gland assembly 10 using the lug assemblies 35 is mounted on the pipe 40 with the gland sections being held together by the clamping brackets 12 as previously described. A bell ring assembly 100 comprising several curved segments held together by clamping brackets 12 is mounted on the bell 90 with the tapered inner surface 101 of the ring assembly seating on the tapered surface 91 of the bell 90. The gland assembly 10 and the ring assembly 100 are connected together by tie-bars 102 which has bent opposite end portions 103 connected by bolt assemblies 104 to the gland assemblies 10 and ring assembly 100. The bolts pass through circumferentially spaced holes, such as the holes 33 in the sections of the gland assembly 10. The lug assemblies 35 grip the outer surface of the pipe end 40 while the inner surface 101 of the ring assembly 100 seats on the bell surface 91 so that the tie-bars 102 a complete bell restraint harness holding the pipe joint between the pipe 40 and the bell 90.

What is claimed is:
1. A segmented retainer gland assembly comprising:
a plurality of circular arc segments sized to form a complete circle when fitted together in end-to-end array;
each of said segments having opposite end flanges projecting from a first face of each segment in an axial direction substantially perpendicular to said face, the end faces of each of said end flanges of adjacent end flanges being coengageable when said gland segments are assembled in circular array;

a clamping bracket for each pair of adjacent end flanges, said clamping bracket having an inside recess opening through a face thereof sized and shaped to receive a pair of said end flanges when said clamping bracket is attached to said first face of said gland segments over said end flanges; and two spaced bolts through each of said clamping brackets and pair of adjacent end flanges for securing each of said clamping brackets to each pair of adjacent joining gland segment ends whereby said segments are secured together by said clamping brackets to form said circular array.

2. A gland assembly in accordance with claim 1 wherein said end flanges and said clamping brackets have tapered contacting surfaces to provide a wedge effect between said brackets and said end flanges to urge said gland segments more tightly together responsive to increases in axial forces along said bolt means holding said brackets over said end flanges.

3. A segmented retainer gland assembly according to claim 2 including means connected with said segments to engage the outer surface of a pipe within said assembly.

4. A restraint harness for holding a pipe joint between a spigot end of a pipe and a bell end of a pipe forming said joint comprising:

a first segmented retainer gland assembly having a plurality of circular segments sized to form a complete circle when fitted together in end-to-end array;

each of said segments having opposite end flanges projecting from a first face of each segment in an axial direction substantially perpendicular to said face, the end faces of each of said end flanges of adjacent end flanges being coengageable when said gland segments are assembled in circular array;

a clamping bracket for each pair of adjacent end flanges, said clamping bracket having an inside recess opening through a face thereof sized and shaped to receive a pair of said end flanges when said clamping bracket is attached to said first face of said gland segments over said end flanges;

two spaced bolts through each of said clamping brackets and pair of adjacent end flanges for securing each of said clamping brackets to each pair of adjacent joining gland segment ends whereby said segments are secured together by said clamping brackets to form said circular array;

including means for engaging the outer surface of said spigot end to restrain said retainer gland assembly against movement along said surface;

a second segmented retainer gland assembly, similar to said first segmented retainer gland assembly, on said bell end of said pipe and including means for engaging said gland assembly with the outer surface of said bell end to restrain said assembly against movement toward the end of said bell end; and circumferentially spaced axial tie means connected between said first and second gland assemblies for coupling said gland assemblies together to hold said spigot pipe end in said bell pipe end.

5. A pipe joint restraint harness in accordance with claim 4 wherein said first segmented retainer gland assembly includes circumferentially spaced lug assemblies for engaging said spigot pipe end surface and said second retainer gland assembly has a tapered internal annular surface engageable with a tapered surface on said bell pipe end surface.

6. A pipe joint restraint harness in accordance with claim 4 wherein said first and second gland assemblies each include circumferentially spaced lug assemblies for engaging the outer surface of the pipe end with each said gland assembly.

* * * * *